US009415537B2

(12) United States Patent
Itani et al.

(10) Patent No.: US 9,415,537 B2
(45) Date of Patent: Aug. 16, 2016

(54) DEMOLDING DEVICE

(75) Inventors: Shinya Itani, Mishima (JP); Hiromi Nishihara, Fuji (JP); Takato Baba, Numazu (JP); Takaharu Tashiro, Gotemba (JP); Takafumi Ookawa, Mishima (JP); Hidetoshi Kitahara, Atami (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 444 days.

(21) Appl. No.: 13/878,144

(22) PCT Filed: Sep. 30, 2011

(86) PCT No.: PCT/JP2011/072633
§ 371 (c)(1),
(2), (4) Date: Aug. 7, 2013

(87) PCT Pub. No.: WO2012/046660
PCT Pub. Date: Apr. 12, 2012

(65) Prior Publication Data
US 2013/0323347 A1   Dec. 5, 2013

(30) Foreign Application Priority Data

Oct. 8, 2010   (JP) .................. 2010-228499

(51) Int. Cl.
*B29C 59/02*   (2006.01)
*B29C 31/00*   (2006.01)
(Continued)

(52) U.S. Cl.
CPC .............. *B29C 59/02* (2013.01); *B29C 31/006* (2013.01); *B29C 33/442* (2013.01); *B29C 37/0003* (2013.01); *B29C 43/021* (2013.01); *B29C 43/3697* (2013.01); *B29C 33/424* (2013.01);
(Continued)

(58) Field of Classification Search
CPC .................. B29C 2059/023; B29C 2043/025; B29C 33/442; B29C 59/02–59/04; B29C 37/0003; B29C 43/3697
See application file for complete search history.

(56) References Cited

U.S. PATENT DOCUMENTS 6,485,596 B1 * 11/2002 Toyoda et al. ................ 156/232
6,761,607 B2    7/2004 Kikuchi
(Continued)

FOREIGN PATENT DOCUMENTS

JM   2011/189610   9/2011
JP   2004-288783   10/2004
(Continued)

OTHER PUBLICATIONS

German Office Action issued in DE 11 2011 103 391.5 on Jul. 10, 2014 with an English Language Translation.
(Continued)

*Primary Examiner* — Alison L Hindenlang
*Assistant Examiner* — Jerzi H Moreno Hernandez
(74) *Attorney, Agent, or Firm* — DLA Piper LLP (US)

(57) ABSTRACT

A demolding device detaches a sheet-shaped mold from a molded product. The demolding device includes a molded product holder placed in a location different from a transfer device. The molded product holder is constructed and arranged to hold the molded product while being adhered to a first region of the mold. A detaching roller on which the mold is wound is movably provided above the molded product holder in an extending direction of the mold to roll up and detach the mold from the molded product.

4 Claims, 11 Drawing Sheets

(51) Int. Cl.
  B29C 37/00   (2006.01)
  B29C 43/02   (2006.01)
  B29C 43/36   (2006.01)
  B29C 33/44   (2006.01)
  B29C 33/42   (2006.01)
  B29C 43/22   (2006.01)
  B29C 59/04   (2006.01)
  B29C 43/34   (2006.01)

(52) U.S. Cl.
  CPC ............... *B29C 43/222* (2013.01); *B29C 59/04* (2013.01); *B29C 2043/025* (2013.01); *B29C 2043/3483* (2013.01); *B29C 2043/3647* (2013.01); *B29C 2043/3652* (2013.01)

(56) References Cited

U.S. PATENT DOCUMENTS

| | | | | |
|---|---|---|---|---|
| 7,503,995 | B2* | 3/2009 | Hayasaka | ............... 156/247 |
| 2003/0145459 | A1 | 8/2003 | Yamamoto | |
| 2007/0152376 | A1* | 7/2007 | Verhoff et al. | ............... 264/334 |
| 2009/0087506 | A1* | 4/2009 | Hasegawa et al. | ........... 425/34.2 |
| 2012/0313289 | A1* | 12/2012 | Itani et al. | ............... 264/238 |

FOREIGN PATENT DOCUMENTS

| | | |
|---|---|---|
| JP | 2009-220562 | 10/2009 |
| JP | 2010-105314 | 5/2010 |
| JP | 2011-189677 | 9/2011 |
| KR | 10-2010-0096396 | 9/2010 |
| TW | 200831274 | 8/2008 |
| TW | 200944363 | 11/2009 |

OTHER PUBLICATIONS

Taiwnese Office Action issued in TW 100136469 on Nov. 15, 2013.
English Language Translation of Taiwnese Office Action issued in TW 100136469 on Nov. 15, 2013.
English Lanugage Abstract of TW 200831274 published on Aug. 1, 2008.
English Lanugage Abstract of TW 200944363 published Nov. 1, 2009.
Korean Office Action issued in KR 10-2013-7008643 on Mar. 21, 2014.
English Language Translation of Korean Office Action issued in KR 10-2013-7008643 on Mar. 21, 2014.
English Language Abstract of KR 10-2010-0096396 published on Sep. 2, 2010.
International Search Report issued in PCT/JP2011/072633 mailed Nov. 1, 2011.
English Language Abstract of JP 2009-220562 published Oct. 1, 2009.
English Language Translation of JP 2009-220562 published Oct. 1, 2009.
English Language Abstract of JP 2004-288783 published Oct. 14, 2004.
English Language Translation of JP 2004-288783 published Oct. 14, 2004.
English Language Abstract of JP 2011-189610 published Sep. 29, 2011.
English Language Translation of JP 2011-189610 published Sep. 29, 2011.
English Language Abstract of JP 2011-189677 published Sep. 29, 2011.
English Language Translation of JP 2011-189677 published Sep. 29, 2011.
English Language Abstract of JP 2010-105314 published May 13, 2010.
English Language Translation of JP 2010-105314 published May 13, 2010.
B.J. Choi, et al., Precision Engineering Journal of the Internation Societies for Precision Engineering and Nanotechnology, vol. 25, 2001, pp. 192-199.

* cited by examiner (a)

(b)

(a)

(b)

(c)

(d)

DEMOLDING DEVICE

TECHNICAL FIELD

This application is a U.S. National Stage Application of International Patent Application No. PCT/JP2011/072633 filed Sep. 30, 2011. International Patent Application No. PCT/JP2011/072633 claims priority to Japanese Patent Application No. 2010-228499 filed Oct. 8, 2010. The entirety of both of the above-listed applications are incorporated herein by reference.

The present invention relates to a demolding device, or more specifically, to a device configured to detach a sheet-shaped mold from a molded product in the case where the sheet-shaped mold adheres to the molded product as a consequence of transferring a fine transfer pattern formed on the sheet-shaped mold to the molded product.

BACKGROUND ART

A nanoimprint technique has been studied and developed in recent years. This technique is designed to produce a mold by forming an ultra fine transfer pattern on a quartz substrate or the like using electron beam lithography or the like, and to transfer the transfer pattern formed on the mold to a molded product by pressing the mold against the molded product at a predetermined pressure (see NPL 1, for example).

Imprinting methods using lithographic techniques have been developed as methods of molding a fine pattern (a transfer pattern) in the nanometer order at low costs. Such molding methods are broadly classified into a thermal imprinting method and a UV imprinting method.

In the thermal imprinting method, a mold is pressed against a substrate while a resin made of a thermoplastic polymer (a thermoplastic resin) is heated to a temperature with which the resin becomes sufficiently flowable, and the resin is fed into a fine pattern. Then, the mold and the resin are cooled down to a glass transition temperature or below, and the mold is detached after the fine pattern transferred to the substrate is solidified.

The UV imprinting method uses a transparent mold that can transmit light. The mold is pressed against a UV curable liquid which is exposed to UV radiation light. The liquid is solidified by being exposed to the radiation light for an appropriate period of time, and the mold is detached after the fine pattern is transferred thereto.

In another aspect of the transfer process, a transfer pattern formed on a mold may be once transferred to a sheet material, and the sheet material to which the transfer pattern is transferred may be used as a secondary mold (a sheet-shaped mold) in order to transfer the transfer pattern on the sheet-shaped mold to a molded product.

Meanwhile, a device shown in PTL 1 (see FIG. 9 and the like in the literature), for example, is known as a device configured to detach a sheet-shaped mold from a molded product by using a roller in the case where the sheet-shaped mold adheres to the molded product as a consequence of transferring a fine transfer pattern formed on the sheet-shaped mold to the molded product.

CITATION LIST

Patent Literature

Japanese Patent Application Publication No. 2010-105314

Non Patent Literature

Precision Engineering Journal of the International Societies for Precision Engineering and Nanotechnology 25 (2001) 192-199

SUMMARY OF INVENTION

Technical Problem

By the way, the conventional device shown in PTL 1 is configured to perform the transfer and the detachment of the sheet-shaped mold by using the same device and the device therefore faces a problem of its complicated structure.

Specifically, the roller needs to be located in a space where the transfer takes place and the roller has to be moved in order to detach the sheet-shaped mold. Hence, the structure of the device is complicated because components including the roller need to be arranged in the limited space.

The present invention has been made in view of the aforementioned problem. An object of the present invention is to simplify a structure of a demolding device configured to detach a sheet-shaped mold, which adheres to a molded product, from the molded product after a fine transfer pattern formed on the sheet-shaped mold is transferred to the molded product.

Solution to Problem

An aspect of the present invention is a demolding device for detaching a sheet-shaped mold adhering to a flat-plate molded product from the molded product after transfer of a fine transfer pattern formed on the mold to the molded product. The demolding device comprises: a molded product holder placed in a location away from a transfer site where the transfer takes place, and configured to hold the molded product out of the mold and the molded product adhering to each other; and a detaching roller unit configured to detach the mold from the molded product by moving relative to the molded product holder, the mold adhering to the molded product held by the molded product holder, and the mold being wound on the detaching roller unit.

The demolding device may further comprise a mold holding unit configured to hold the mold in a place between the transfer site where the transfer takes place and the molded product holder.

The demolding device may further comprise a tension adjusting unit configured to adjust a tension of the mold.

Advantageous Effects of Invention

The present invention has an effect that a structure of a demolding device, which is configured to detach a sheet-shaped mold adhering to a molded product from the molded product after a fine transfer pattern formed on the sheet-shaped mold is transferred to the molded product, can be simplified as compared to that of a conventional device.

DESCRIPTION OF EMBODIMENTS

Figure 1:
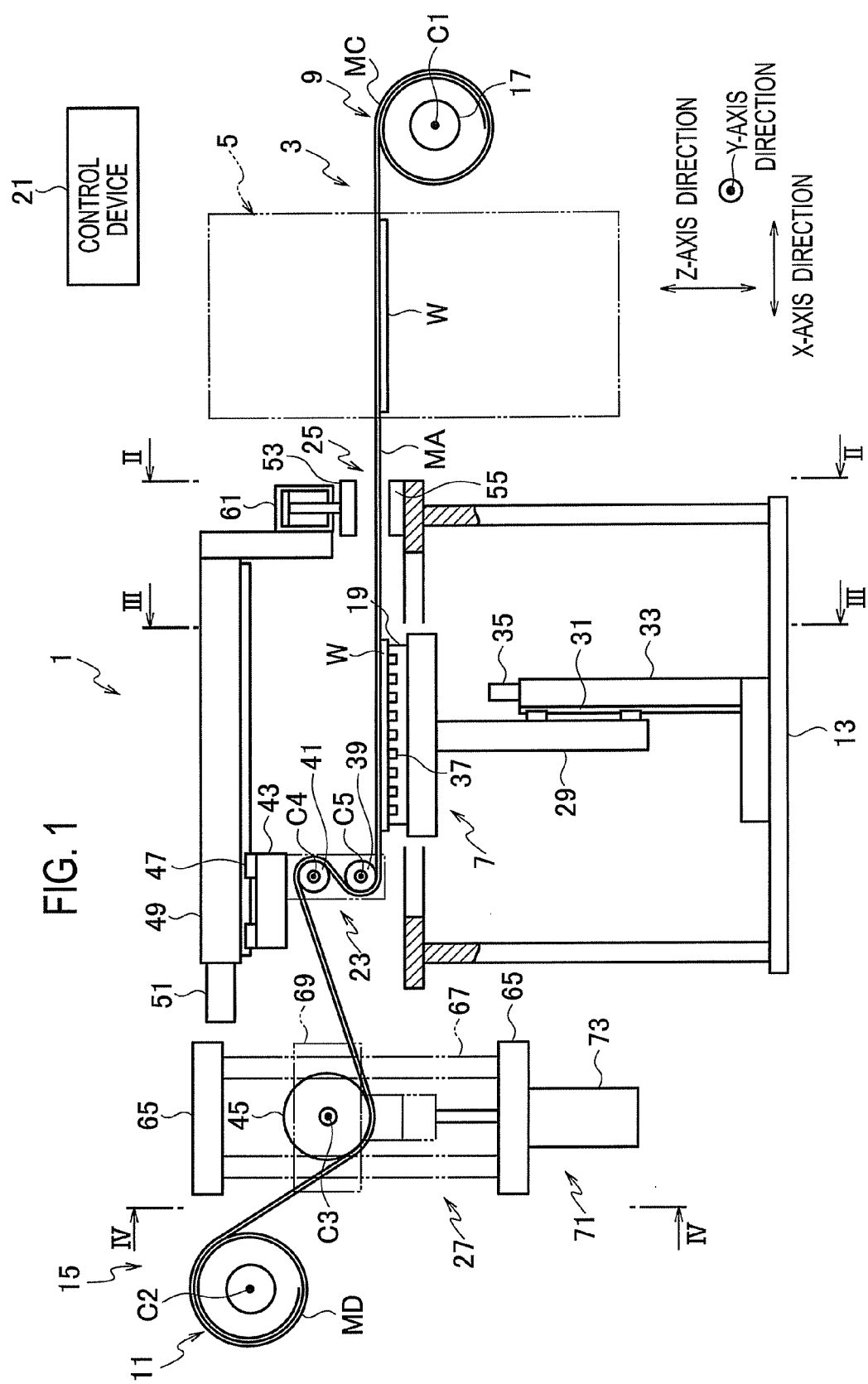
FIG. 1 is a front view showing a schematic configuration of a transfer system according to an embodiment of the present invention.

As shown in FIG. 1 and the like, a transfer system 1 includes a sheet-shaped mold feed positioning device 3, a transfer device 5, and a demolding device (a detaching device) 7.

In the following, one horizontal direction will be defined as an X-axis direction while another horizontal direction perpendicular to the X-axis direction will be defined as a Y-axis direction, and a vertical direction orthogonal to the X-axis direction and the Y-axis direction will be defined as a Z-axis direction for the convenience of the explanation.

The sheet-shaped mold feed positioning device 3 includes a unused-rolled mold locating device 9 and a mold reeling device 11. The sheet-shaped mold feed positioning device 3 is a device configured to shape a sheet-shaped mold MA into a flat plate in a predetermined location (between the unused-rolled mold locating device 9 and the mold reeling device 11, for example), and to feed the flat-plate sheet-shaped mold MA in a predetermined direction (from the right to the left in FIG. 1, for example) and to position the sheet-shaped mold MA.

The transfer device 5 is a device for transferring a fine transfer pattern MB (see FIG. 9), which is formed on the sheet-shaped mold MA, to a molded product W.

The detaching device (a sheet-shaped mold separation device) 7 is a device for detaching (separating) the sheet-shaped mold MA from the molded product W in the case where the sheet-shaped mold MA adheres to the molded product (a transferred molded product) W after undergoing a transfer process by the transfer device 5.

The transfer device 5 and the detaching device 7 are located between the unused-rolled mold locating device 9 and the mold reeling device 11. The transfer device 5 and the detaching device 7 are located away from each other in the X-axis direction. The transfer device 5 is placed on an upstream side (close to the unused-rolled mold locating device 9) in a feeding direction of the sheet-shaped mold MA by the sheet-shaped mold feed positioning device 3, and the detaching device 7 is placed on a downstream side (close to the mold reeling device 11) in the feeding direction of the sheet-shaped mold MA by the sheet-shaped mold feed positioning device 3.

The flat-plate sheet-shaped mold MA is fed and positioned for preparation of the transfer process when the fine transfer pattern MB (see FIG. 9) on the flat-plate sheet-shaped mold MA is transferred to the flat-plate molded product W by using the transfer device 5, and for preparation of a detachment process when the sheet-shaped mold MA is detached from the molded product W by using the demolding device 7 in the case where the sheet-shaped mold MA adheres to the molded product W as a consequence of the transfer process.

The sheet-shaped mold feed positioning device 3 will now be described further in detail.

The sheet-shaped mold feed positioning device 3 includes the unused-rolled mold locating device 9 (an unreeling roller) configured to locate a unused-rolled mold MC, the mold reeling device 11 (a reeling roller) configured to reel in the sheet-shaped mold MA that is unreeled (extending) out of the unused-rolled mold located on the unused-rolled mold locating device, and a sheet-shaped mold position detecting device (not shown).

Moreover, as described previously, the sheet-shaped mold MA extends out and is shaped substantially into the flat plate in the place between the unused-rolled mold locating device 9 and the mold reeling device 11. The width direction of the sheet-shaped mold MA in the flat plate shape coincides with the Y-axis direction. For example, the longitudinal direction thereof coincides with the X-axis direction or an oblique direction with respect to the X axis, and a thickness direction thereof coincides with the Z-axis direction or an oblique direction with respect to the Z-axis. Here, the unused-rolled mold locating device 9 and the mold reeling device 11 are provided integrally with a base 13 of the detaching device 7 via unillustrated brackets, for example.

A given tension in the longitudinal direction is applied from tension applying means 15 to the sheet-shaped mold MA in the flat plate shape between the unused-rolled mold locating device 9 and the mold reeling device 11. Thus, the sheet-shaped mold MA maintains the state of the flat plate shape. The fine transfer pattern MB, which is not illustrated in FIG. 1 and the like, is formed on a lower surface of the flat-plate sheet-shaped mold MA.

The unused-rolled mold (the mold in a rolled shape) MC is the mold in the shape of a roll before being used in the transfer process by the transfer device 5. The unused-rolled mold MC is formed into a cylindrical or columnar shape by rolling the sheet-shaped mold MA around an outer periphery of a columnar core member 17 in such a manner that a circumferential direction of the outer periphery coincides with the longitudinal direction of the sheet-shaped mold MA.

A reeled mold MD reeled in by the mold reeling device 11 is the mold having been used in the transfer process by the transfer device 5 and detached from the molded product W by the detaching device 7. The reeled mold MD is in the shape of a roll as similar to the unused-rolled mold MC.

The unused-rolled mold MC located on the unused-rolled mold locating device 9 is rotatable around a central axis (an axis extending in the Y-axis direction) C1 of the unused-rolled mold MC. The reeled mold MD reeled in by the mold reeling device 11 is also rotatable around a central axis (an axis extending in the Y-axis direction) C2 of the reeled mold MD.

The flat-plate sheet-shaped mold MA which is present between the unused-rolled mold locating device 9 and the mold reeling device 11 is fed and positioned by the sheet-shaped mold feed positioning device 3 by means of reeling in a predetermined length of the flat-plate sheet-shaped mold MA with the mold reeling device 11.

A single feeding distance by the sheet-shaped mold feed positioning device 3 is either equal to a pitch of a region where the fine transfer pattern MB is formed, or equal to a distance (a distance in the X-axis direction) between the center in the X-axis direction of the transfer device 5 and the center in the X-axis direction of the detaching device 7 (a molded product holder 19 to be described later in detail).

In addition, when the sheet-shaped mold MA is fed or after it is fed by the sheet-shaped mold feed positioning device 3, the sheet-shaped mold MA extending in the place between the unused-rolled mold locating device 9 and the mold reeling device 11 is kept substantially in the same position while retaining the given tension with the assistance of the tension applying means 15.

The tension applying means 15 will be described in detail with an example. The unused-rolled mold MC located on the unused-rolled mold locating device 9 is made rotatable by being connected to a rotation output shaft of an actuator such as a motor via a torque control clutch such as a powder clutch. The sheet-shaped mold (the reeled mold) MD to be reeled in by the mold reeling device 11 is made rotatable by being connected to a rotation output shaft of an actuator such as a servo motor.

Meanwhile, in the case of feeding the flat-plate sheet-shaped mold MA extending in the place between the unused-rolled mold locating device 9 and the mold reeling device 11, under control of a control device 21, the motor of the unused-rolled mold locating device 9 is reversely rotated (the rotation output shaft of the motor for the unused-rolled mold MC is reversely rotated so as to reel in the flat-plate sheet-shaped mold MA by the unused-rolled mold locating device 9), torque of the powder clutch is set to a predetermined value T1, and the rotation output shaft of the servo motor of the mold reeling device 11 is rotated by a predetermined rotation angle with predetermined torque T2 in a direction of reeling in the flat-shape sheet-shaped mold MA.

In this case, when the radius of the unused-rolled mold MC located on the unused-rolled mold locating device 9 is defined as "R1" and the radius of the reeled mold MD on the mold reeling device 11 is defined as "R2", then a relation "T1/R1<T2/R2" holds true. Accordingly, the flat-plate sheet-shaped mold MA extending in the place between the unused-rolled mold locating device 9 and the mold reeling device 11 is fed to the mold reeling device 11 while maintaining a predetermined tension F1 (F1=T1/R2−T1/R1).

In the state where the flat-plate sheet-shaped mold MA is not fed by the sheet-shaped mold feed positioning device 3 and the flat-plate sheet-shaped mold MA therefore maintains in the same position, the rotation output shaft of the servo motor of the mold reeling device 11 stands still with predetermined retention torque. Meanwhile, the flat-plate sheet-shaped mold MA gains the predetermined tension by way of the motor and the powder clutch of the unused-rolled mold locating device 9.

Determination of the feeding distance (feed positioning) of the flat-plate sheet-shaped mold MA extending in the place between the unused-rolled mold locating device 9 and the mold reeling device 11 is made by using the unillustrated sheet-shaped mold position detecting device (an unillustrated sheet-shaped mold position detector).

The sheet-shaped mold position detecting device is configured to detect a predetermined region (such as an unillustrated alignment mark) of the sheet-shaped mold MA by using an unillustrated sensor. Specifically, the sheet-shaped mold is positioned by stopping the feed of the sheet-shaped mold MA by the feed positioning device 3 under control of the control device 21 depending on a result of detection with the sensor when the sheet-shaped mold is being fed by the sheet-shaped mold feed positioning device 3.

Here, a transfer process employing the transfer device 5 according to a UV imprinting method will be described by using FIG. 9.

The fine transfer pattern MB on the sheet-shaped mold MA is formed of numerous fine bumps and indents, for example. The fine transfer pattern MB is formed on one of surfaces in the thickness direction of the sheet-shaped mold MA with the height and pitch set approximately equal to a wavelength of visible light or slightly greater than the wavelength of visible light. In other words, the fine transfer pattern MB is formed on a lower surface, for instance, of the flat-plate sheet-shaped mold MA.

Figure 9:
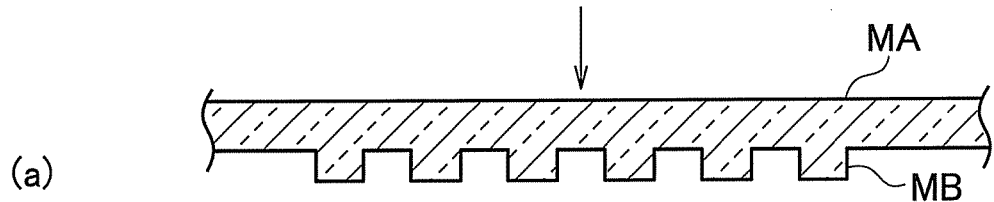
FIG. 9 is a view showing an outline of a transfer process according to the embodiment of the present invention.
Figure 9:
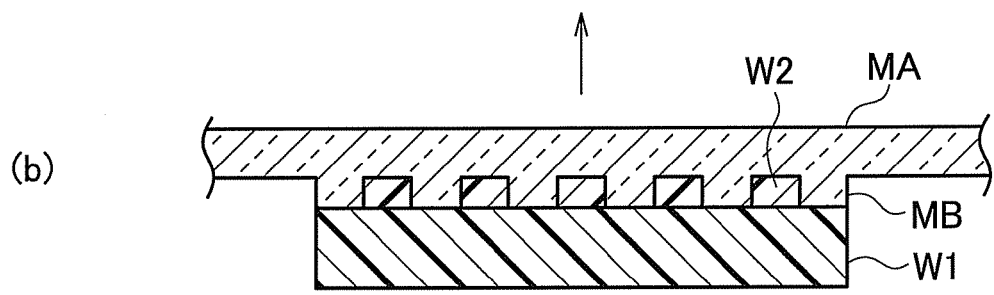
Figure 9:
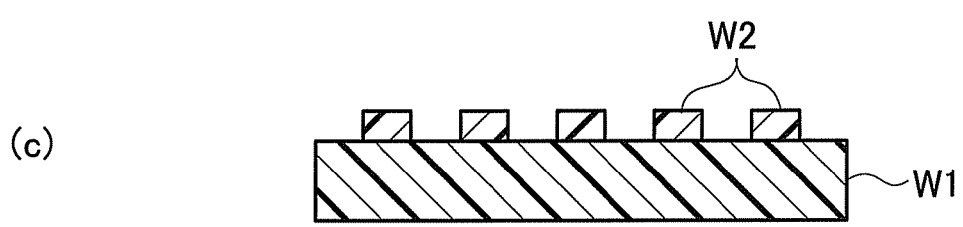
Figure 9:

In the UV imprinting method, the transfer device 5 is used to move the sheet-shaped mold MA in a direction of an arrow indicated in FIG. 9($a$), to press the molded product W with a little force via the sheet-shaped mold MA as shown in FIG. 9($b$), and to emit ultraviolet rays to cure an ultraviolet curable resin W2. Thus, the fine transfer pattern is transferred to the molded product W (the ultraviolet curable resin W2). Here, the molded product is formed by providing a thin film of the ultraviolet curable resin W2 on one of surfaces (such as an upper surface) in the thickness direction of a flat-plate base material (a base material made of glass, silicon or the like) W1.

Thereafter, when the sheet-shaped mold MA is separated from the molded product W by using the detaching device 7, a fine transfer pattern (a pattern inverted to the transfer pattern MB on the sheet-shaped mold MA) formed on the molded product W (the ultraviolet curable resin W2) emerges and shown in FIG. 9($c$).

Then, the unillustrated remaining film is removed by ashing or the like using another device. Then, in the state shown in FIG. 9($c$), a fine transfer pattern is formed on the base material W1 by etching while using the ultraviolet curable resin W2 as a masking member. Thereafter, the transfer of the fine transfer pattern to the base material W1 is completed as shown in FIG. 9($d$) by removing the cured ultraviolet curable resin W2 with a solvent, for example.

Although the above description has been given of the UV imprinting method as an example, the transfer device 5 may be constructed as a device for performing a thermal imprinting method by providing the transfer device 5 with devices for heating and cooling the molded product W.

The transfer device 5 will now be described in detail.

As mentioned above, the transfer device 5 is the device configured to press the flat-plate sheet-shaped mold MA against the molded product W and thereby to transfer the fine transfer pattern MB formed on the flat-plate sheet-shaped mold MA to the molded product (a transferred product) W.

The molded product W is formed into a rectangular flat plate shape, for example, and is located on the transfer device 5 in such a manner that the longitudinal direction of the molded product W coincides with the X-axis direction, the width direction thereof coincides with the Y-axis direction, and the thickness direction thereof coincides with the Z-axis direction.

Upon completion (stop) of feed positioning of the sheet-shaped mold MA by the sheet-shaped mold feed positioning device 3, the thickness direction of the sheet-shaped mold MA is aligned with the Z-axis direction and the sheet-shaped mold MA is placed slightly above the molded product W located on the transfer device 5. Meanwhile, in a plan view, the fine transfer pattern MB and a region of the molded product W located on the transfer device 5, where the fine transfer pattern is to be formed, overlap each other when viewed in the Z-axis direction. The width of the sheet-shaped mold MA is substantially equal to the width of the molded product W.

The transfer device 5 accomplishes the transfer by pressing the sheet-shaped mold MA against the molded product W in the Z-axis direction, for example. Immediately after the transfer has been accomplished (before detachment is performed by the detaching device 7), the lower surface of the sheet-shaped mold MA is in contact with the upper surface of the molded product W, and thus the sheet-shaped mold MA adheres to the molded product W (see FIG. 9(*b*) and the like). Moreover, the molded product W is placed below the sheet-shaped mold MA.

Next, the detaching device 7 will be described in detail.

As mentioned above, the demolding device 7 is the device configured to detach the sheet-shaped mold MA from the molded product W in the case where the sheet-shaped mold MA adheres to the molded product W after the transfer process of transferring the fine transfer pattern MB formed on the sheet-shaped mold MA to the flat-plate molded product W by using the transfer device 5, for example.

The demolding device 7 includes the molded product holder 19 and a detaching roller unit (e.g., detaching roller) 23.

The molded product holder 19 is placed in a position away in the X-axis direction, for instance, from a transfer site (the transfer device 5) where the transfer process takes place, and is configured to hold the molded product W out of the sheet-shaped mold MA and the molded product W adhering to each other.

The detaching roller unit 23 is also placed in a position away in the X-axis direction, for instance, from the transfer site (the transfer device 5) where the transfer process takes place. In addition, the sheet-shaped mold MA adhering to the molded product W held by the molded product holder 19 is supposed to be wound on the detaching roller unit 23. Moreover, the sheet-shaped mold MA is detached from the molded product W when the detaching roller unit 23 with the sheet-shaped mold MA being wound thereon moves relative to the molded product holder 19 (the molded product W).

The demolding device 7 is also provided with a mold holding unit 25 and a tension adjusting unit (e.g., tension adjuster) 27. The mold holding unit 25 is configured to hold the sheet-shaped mold MA in a place between the transfer device 5 and the molded product holder 19. The tension adjusting unit 27 is configured to adjust the tension of the sheet-shaped mold MA that stretches between either the detaching roller 23 or the mold holding unit 25 and the mold reeling device 11.

To be more precise, the tension adjusting unit 27 is configured to adjust the tension of the flat-plate sheet-shaped mold MA at a substantially constant level so as to prevent the sheet-shaped mold MA from loosening or from being cut off due to an excessive tension even when the state of the flat-plate sheet-shaped mold MA (such as a path length of the stretch of the flat-plate sheet-shaped mold MA that is present between the mold holding unit 25 and the mold reeling device 11) changes as a consequence of detaching the sheet-shaped mold MA from the molded product W by use of the detaching roller unit 23.

The tension adjusting unit 27 adjusts the tension of the flat-plate sheet-shaped mold MA at the substantially constant level irrespective of the state of the flat-plate sheet-shaped mold MA, and can thereby prevent the sheet-shaped mold MA from loosening or being cut off when the molded product W is detached from the flat-plate sheet-shaped mold MA.

Now, the detaching device 7 will be described further in detail.

As mentioned above, the detaching device 7 is provided with the base 13. The molded product holder 19 is located at a central part in the X-axis direction of the base 13.

In addition, the molded product holder 19 is situated above a molded product holder support 29 and provided integrally with the molded product holder support 29. The molded product holder support 29 (the molded product holder 19) is supported by a bracket (a bracket provided integrally with the base 13) 33 via a linear guide bearing 31, and is made movable in the Z-axis direction relative to the base 13.

Moreover, the molded product holder 19 (the molded product holder support 29) can be freely moved and positioned in the Z-axis direction by an actuator such as a servo motor 35 under control of the control device 21. An upper surface of the molded product holder 19 is formed into a rectangular shape and spreads horizontally. The longitudinal direction of the molded product holder 19 coincides with the X-axis direction and the width direction thereof coincides with the Y-axis direction.

When the molded product holder 19 is placed on an upper end, the upper surface of the molded product holder 19 protrudes slightly upward from an upper end of the base 13. When the molded product holder 19 is placed on a lower end, the molded product holder 19 is placed inside the base 13.

The sheet-shaped mold MA which was subjected to the transfer process by the transfer device 5 and is provided with the molded product W adhering to the lower surface thereof, is fed downstream (toward the demolding device 7) from the transfer device 5 by a predetermined distance and is positioned by the sheet-shaped mold feed positioning device 3 under control of the control device 21.

As a consequence of feed positioning by the sheet-shaped mold feed positioning device 3, the molded product W to which the sheet-shaped mold MA adheres as a consequence of the transfer process is placed above (almost directly above) the molded product holder 19.

As described above, in the state where the molded product W adhering to which the sheet-shaped mold MA is placed above the molded product holder 19, the width direction of any of the sheet-shaped mold MA and the molded product W coincides with the width direction of the molded product holder 19.

Meanwhile, a dimension in the width direction of the upper surface of the molded product holder 19 is substantially equal to or slightly greater than a dimension in the width direction of the molded product W, and a dimension in the longitudinal direction of the upper surface of the molded product holder 19 is substantially equal to or slightly greater than a dimension in the longitudinal direction of the molded product W.

Further, when the state of the molded product W adhering to the sheet-shaped mold MA and being placed above the molded product holder 19 is viewed in the Z-axis direction, the molded product W is present on an inner side of the upper surface (the molded product holder 19) of the molded product holder 19, for example.

In addition, multiple vacuum holding grooves 37 are provided on the upper surface of the molded product holder 19. When the molded product W adhering to the sheet-shaped mold MA is placed above the molded product holder 19 and the molded product holder 19 is placed on the upper end, the lower surface of the molded product W adhering to the sheet-shaped mold MA comes into surface contact with the upper surface of the molded product holder 19. Hence, the molded product holder 19 holds the molded product W, which adheres to the sheet-shaped mold MA, by vacuum holding under control of the control device 21.

When the molded product holder 19 is placed on the lower end, the molded product holder 19 is away from the sheet-shaped mold MA and the molded product W adhering to the sheet-shaped mold MA.

As has already been understood, molded products W adhere to the sheet-shaped mold MA while providing given intervals in the X-axis direction therebetween. Accordingly, there is a region of the sheet-shaped mold MA without adhesion of any molded products W (a region where only the sheet-shaped mold MA is present).

For example, the detaching roller unit 23 includes two rollers, namely, a lower roller 39 and an upper roller 41. The lower roller 39 is formed into a columnar or cylindrical shape, of which a shaft C5 extends in the Y-axis direction and is rotatably supported (in such a manner as to be rotatable around the shaft C5) by a roller support 43.

Meanwhile, a lower end of the lower roller 39 is placed slightly above the upper surface of the molded product support 19 placed on the upper end. Specifically, there is a clearance in the Z-axis direction between the lower roller 39 and the upper surface of the molded product support 19 placed on the upper end. Here, the clearance has either a value equal to a sum of the thickness of the sheet-shaped mold MA and the thickness of the molded product W, or a value slightly greater than such a sum.

Moreover, a dimension in the width direction (the dimension in the Y-axis direction) of the lower roller 39 is greater than the width of the sheet-shaped mold MA. In the Y-axis direction, the center of the lower roller 39 and the center of the sheet-shaped mold MA coincide with each other.

The upper roller 41 is formed into the same shape as the lower roller 39, for example. A shaft C4 of the upper roller 41 extends in the Y-axis direction and is rotatably supported (in such a manner as to be rotatable around the shaft C4) by the roller support 43 in a position above the lower roller 39 and away from the lower roller 39. In addition, the lower roller 39 and the upper roller 41 are placed mutually in the same positions in terms of the Y-axis direction and the X-axis direction, for example.

Meanwhile, the sheet-shaped mold MA fed out of the unused-rolled mold MC located on the unused-rolled mold locating device 9 is wound on the lower roller 39, then wound on the upper roller 41, then wound on a roller 45 of the tension adjusting unit 27, and reeled in by the mold reeling device 11.

The sheet-shaped mold MA is wound on the lower roller 39 on a downstream side (close to the mold reeling device 11). Moreover, the sheet-shaped mold MA is wound on the upper roller 41 on an upstream side (close to the unused-rolled mold locating device 9).

As a consequence, when viewed in the Y-axis direction, the sheet-shaped mold MA wound on the lower roller 39 and the upper roller 41 is in an "S" shape or an inverted "S" shape as shown in FIG. 1 and the like.

The sheet-shaped mold MA spreads in the X-axis direction as well as in the Y-axis direction in a place between the unused-rolled mold locating device 9 and the lower roller 39, and is made straight when viewed in the Y-axis direction. In the meantime, the sheet-shaped mold MA is wound on the roller 45 of the tension adjusting unit 27 on a lower side of the roller 45. In a place between the upper roller 41 and the roller 45 of the tension adjusting unit 27 and a place between the roller 45 of the tension adjusting unit 27 and the mold reeling device 11, the width direction of the sheet-shaped mold MA, is aligned with the Y-axis direction while the longitudinal direction thereof is inclined into a "V" shape when viewed in the Y-axis direction.

In the meantime, the roller support 43 is supported by a roller base body 49 via a linear guide bearing 47, and is made movable relative to the roller base body 49 in the X-axis direction. The roller base body 49 is provided integrally with the base 13 via an unillustrated bracket.

Moreover, the roller support 43 can be freely moved and positioned in the X-axis direction by an actuator such as a servo motor 51 and under control of the control device 21. Further, each of the lower roller 39 and the upper roller 41 is moved in the X-axis direction at a predetermined velocity and is positioned.

When the lower roller 39 and the upper roller 41 are respectively placed in the most downstream side, the lower roller 39 and the upper roller 41 are present downstream of the molded product holder 19 and upstream of the roller of the tension adjusting unit 27. When the lower roller 39 and the upper roller 41 are respectively placed in the most upstream side, the lower roller 39 and the upper roller 41 are present upstream of the molded product holder 19 and downstream of the mold holding unit 25.

The roller support 43 is placed above the molded product holder 19 as well as the base 13 and away from the molded product holder 19 as well as the base 13. The roller base body 49 is placed above the roller support 43.

An upper clamp 53 constituting the mold holding unit 25 is provided on an end portion (an end portion close to the transfer device 5) of the roller base body 49. Meanwhile, a lower clamp 55 constituting the mold holding unit 25 is provided integrally with an upper part of the base 13, which is an end portion (an end portion close to the transfer device 5) of the base 13.

Figure 2:
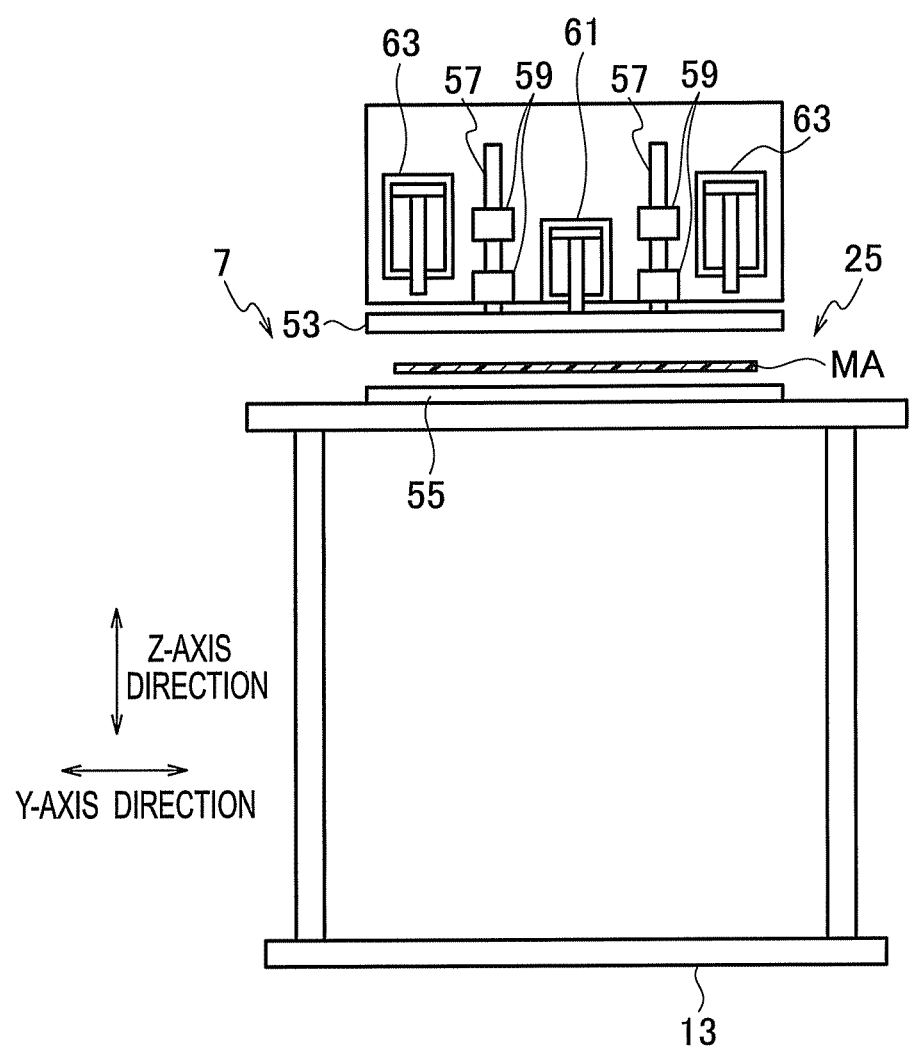
FIG. 2 is a view taken along the II-II line in FIG. 1 and viewed in the direction of arrows attached thereto.
Figure 3:
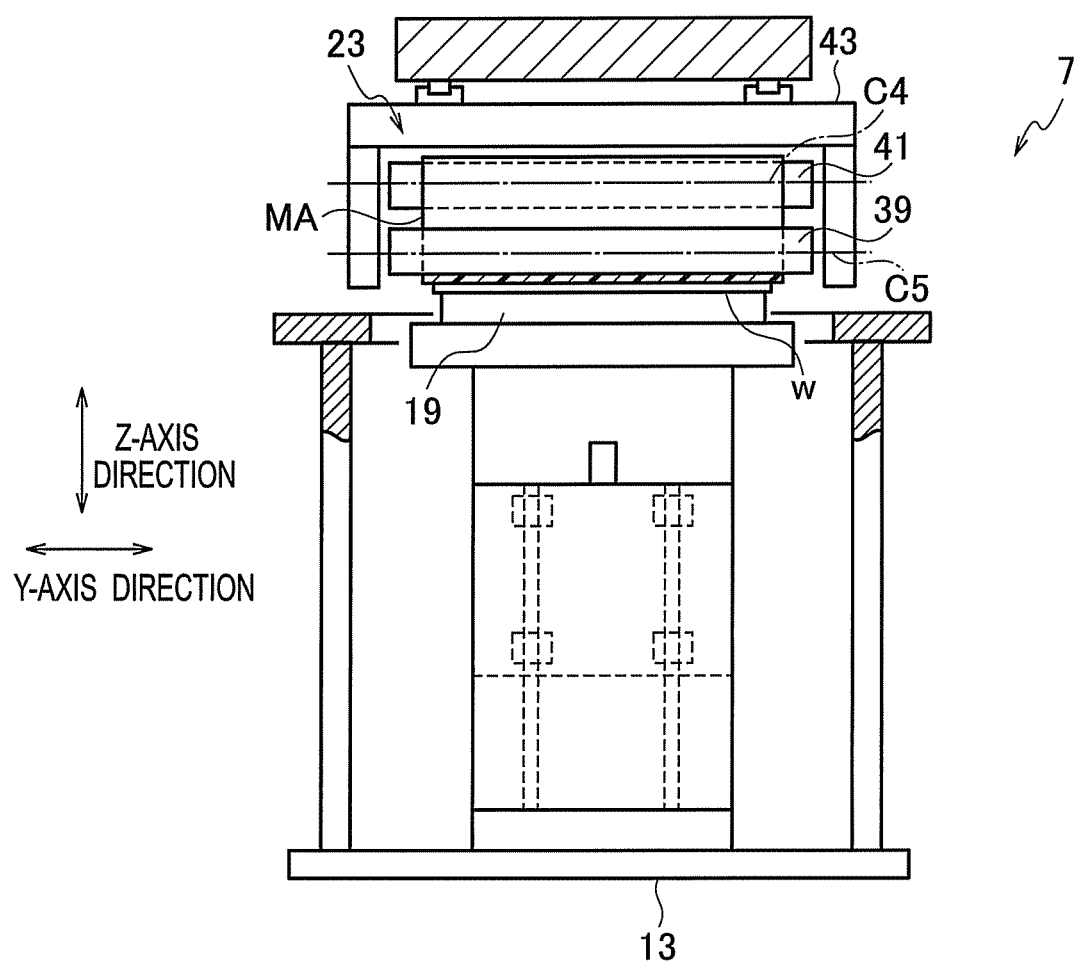
FIG. 3 is a view taken along the III-III line in FIG. 1 and viewed in the direction of arrows attached thereto.
Figure 4:
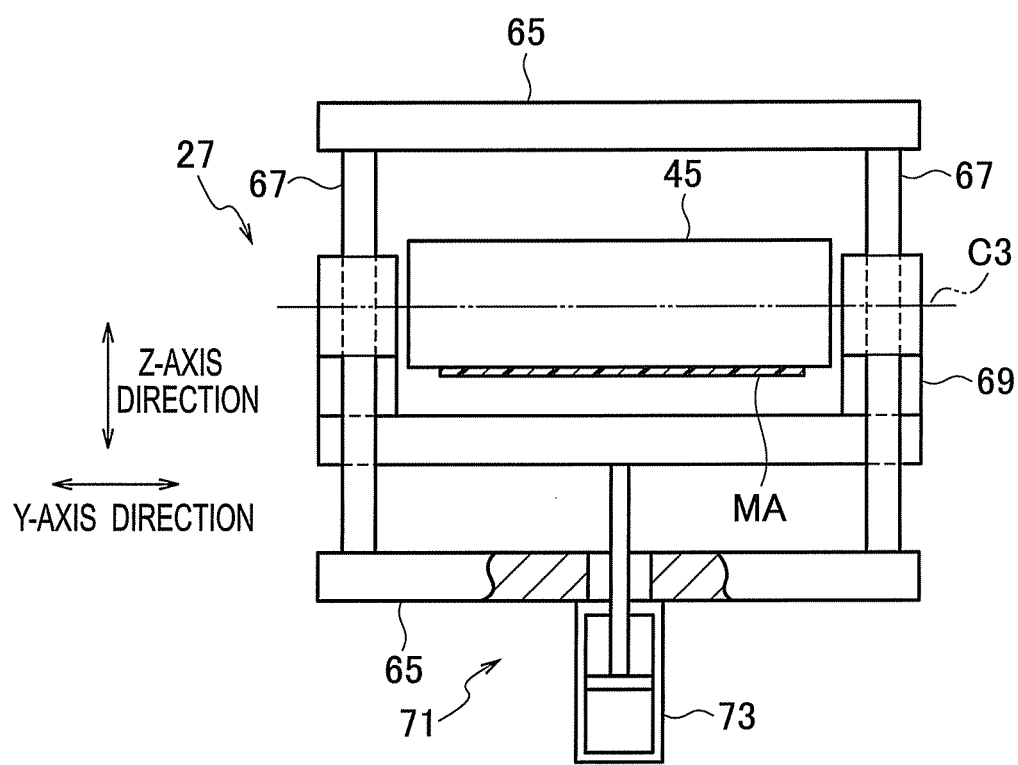
FIG. 4 is a view taken along the IV-IV line in FIG. 1 and viewed in the direction of arrows attached thereto.

As shown in FIG. 2, guide bars 57 are provided integrally with the upper clamp 53. The guide bars 57 are placed above the upper clamp 53 and stand upright from the upper clamp 53. Moreover, the guide bars 57 are engaged with guide bearings 59 that are provided integrally with the roller base body 49. Thus, the upper clamp 53 is made movable in the Z-axis direction relative to the roller base body 49 (the base 13).

Meanwhile, the upper clamp 53 is moved in the Z-axis direction under control of the control device 21 by using an actuator such as a cylinder (an air cylinder, for example) 61 provided on an upper part of the upper clamp 53. A cylinder portion of the air cylinder 61 is provided integrally with the roller base body 49 and a tip end portion of a piston rod thereof is engaged integrally with the upper clamp 53.

A lower surface of the upper clamp 53 is formed into a rectangular flat plate shape. The width direction of the lower surface of the upper clamp 53 is aligned with the X-axis direction and the longitudinal direction of the lower surface is aligned with the Y-axis direction. A dimension in the longitudinal direction of the lower surface of the upper clamp 53 is set greater than the width of the sheet-shaped mold MA, and the position of the center of the sheet-shaped mold MA coincides with the position of the center of the lower surface of the upper clamp 53 in terms of the Y-axis direction.

An upper surface of the lower clamp 55 is formed into the same shape and in the same size as the lower surface of the upper clamp 53, for example. When viewed in the Z-axis direction, the lower surface of the upper clamp 53 and the upper surface of the lower clamp 55 overlap each other.

In the Z-axis direction, the upper surface of the lower clamp 55 is placed below the sheet-shaped mold MA and slightly away (away by a value slightly greater than the thickness of the molded product W) from the sheet-shaped mold MA that extends horizontally in the place defined with the unused-rolled mold locating device 9.

When the upper clamp 53 is placed on an upper end, the upper clamp 53 is placed above the sheet-shaped mold MA and away from the sheet-shaped mold MA that extends horizontally in the place defined with the unused-rolled mold locating device 9. Meanwhile, the lower clamp 55 is placed below the sheet-shaped mold MA and away from the sheet-shaped mold MA that extends horizontally in the place defined with the unused-rolled mold locating device 9.

In the meantime, the upper clamp 53 and the lower clamp 55 are configured to sandwich and hold the sheet-shaped mold MA that extends horizontally in the place defined with the unused-rolled mold locating device 9 as the upper clamp 53 moves downward from the upper end.

When the upper clamp 53 and the lower clamp 55 are sandwiching and holding the sheet-shaped mold MA, the upper surface of the lower clamp 55 is in contact with the lower surface of the sheet-shaped mold MA (the region without adhesion of any molded products W) and the lower surface of the upper clamp 53 is in contact with the upper surface of the sheet-shaped mold MA. When the sheet-shaped mold MA is sandwiched, the region of the sheet-shaped mold MA held by the mold holding unit 25 (grasped by the upper clamp 53 and the lower clamp 55) and the like slightly move downward. However, this movement is minimal so that the tension of the sheet-shaped mold MA is hardly changed. Hence, troubles such as deformation of the sheet-shaped mold MA do not occur.

In the meantime, the sheet-shaped mold MA adhering to the molded product W as a consequence of the transfer process is detached from the molded product W as described below in detail.

Figure 5:
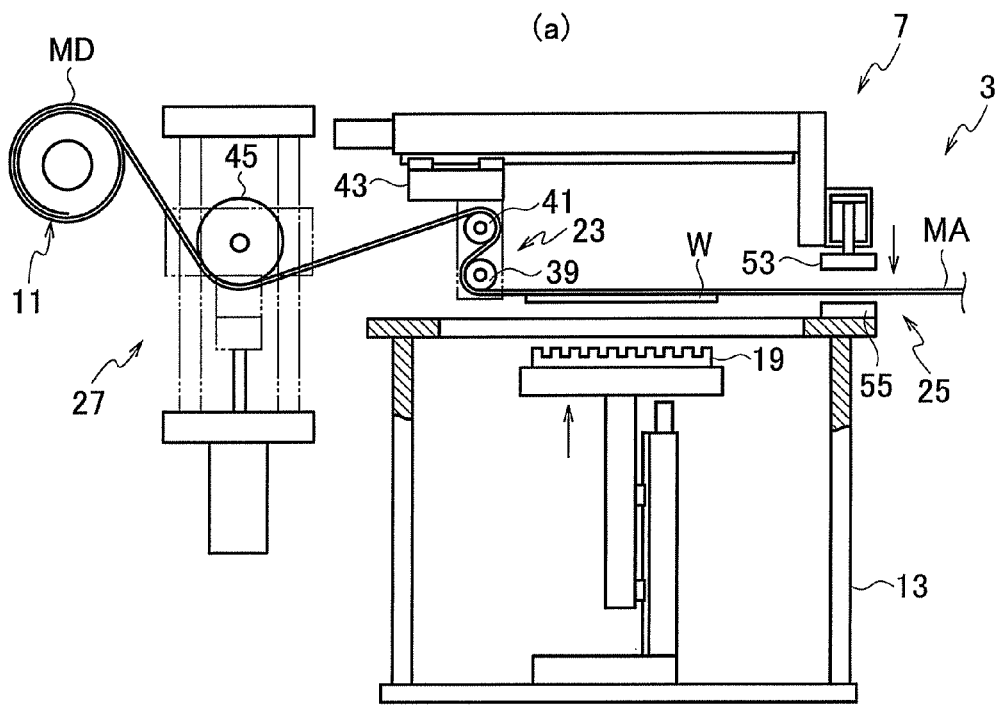
FIG. 5 is a view showing operations of a demolding device according to the embodiment of the present invention.
Figure 5:
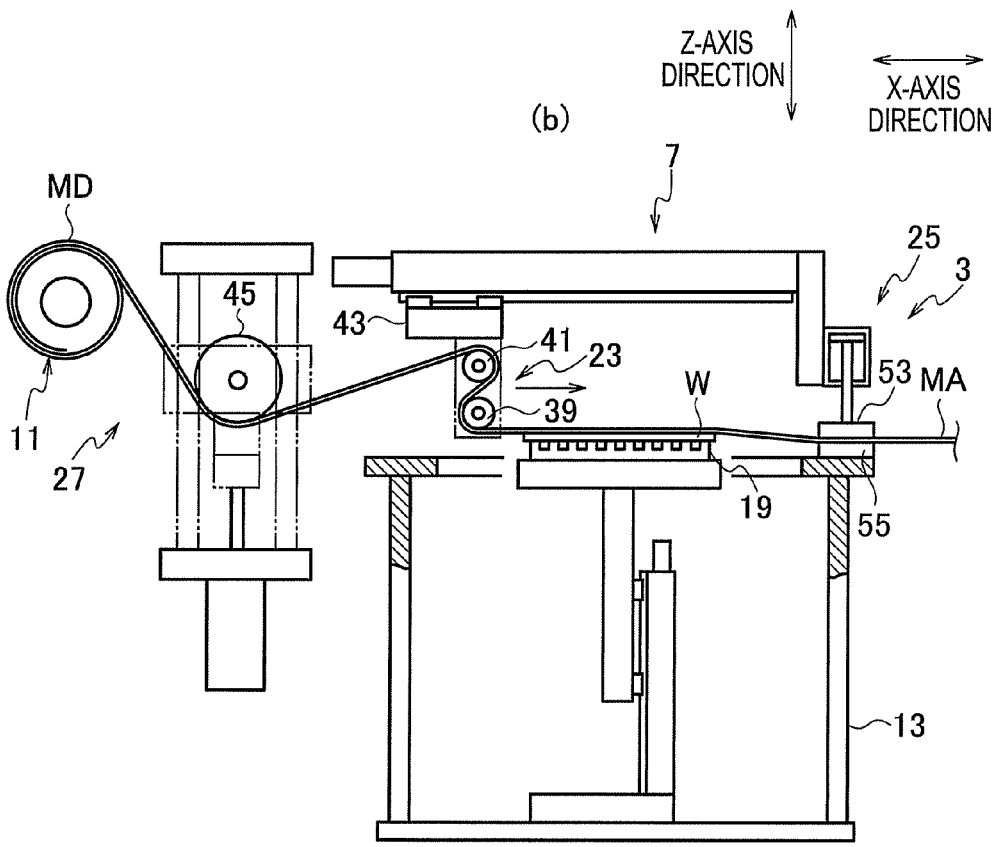

First, the molded product holder 19 is moved downward while the upper clamp 53 is moved upward and the detaching roller unit 23 is placed at the end portion on the downstream side (see FIG. 5(*a*)). In this state, the sheet-shaped mold MA is fed and positioned by the sheet-shaped mold feed positioning device 3 such that the molded product W adhering to the sheet-shaped mold MA as a consequence of the transfer process is placed immediately above the molded product holder 19.

Subsequently, the molded product holder 19 is moved upward and placed on the upper end. The molded product W is held by the molded product holder 19. Then, the upper clamp 53 is moved downward and the sheet-shaped mold MA is held by the mold holding unit 25 (see FIG. 5(*b*)). Next, the detaching roller unit 23 (the roller support 43) is moved to the upstream side at a predetermined velocity until reaching an end portion on the upstream side (see FIG. 6).

As a consequence of performing the above-described operations, the detaching roller unit 23 (the lower roller 39 and the upper roller 41) is rotated synchronously with the movement of the roller support 43, and the sheet-shaped mold MA is detached (torn off) from the molded product W. In other words, a linear boundary (a boundary extending in the width direction of the sheet-shaped mold MA) between a region where the detachment is completed and a region where the detachment is not completed transitions from one end portion to the other end portion (from the left to the right in FIG. 1, for example) of the sheet-shaped mold MA in the state where there is no skid between the detaching roller unit 23 and the sheet-shaped mold MA. The detachment is accomplished when this transition is completed.

In the meantime, in the above description, the single air cylinder 61 is provided at the central part (the central part in the Y-axis direction) of the upper clamp 53 in order to move the upper clamp 53 and to hold the sheet-shaped mold MA. Here, auxiliary cylinders (such as air cylinders) 63 may be provided in addition to the air cylinder 61 (see FIG. 2).

There are provided two auxiliary cylinders 63, for example, which are arranged respectively away by given distances in the Y-axis direction from the air cylinder 61 and symmetrically with respect to the air cylinder 61.

Each auxiliary cylinder 63 is placed above the upper clamp 53 and a cylinder portion thereof is provided integrally with the roller base body 49. Meanwhile, a cylinder rod of the auxiliary cylinder 63 extends downward from the cylinder portion but is not connected to the upper clamp 53. Thus, the cylinder rod can freely come into contact with or recede from the upper clamp 53.

When the piston rod of the air cylinder 61 is moved upward and the upper clamp 53 is placed on the upper end, a piston rod of the auxiliary cylinder 63 is moved upward and is placed at an upper end. Meanwhile, the piston rod of the auxiliary cylinder 63 is away from the upper clamp 53 (see FIG. 2).

On the other hand, when the piston rod of the auxiliary cylinder 63 is moved downward in the state where the sheet-shaped mold MA is grasped by moving the piston rod of the air cylinder 61 downward and moving the upper clamp 53 downward, a lower end of the piston rod of the auxiliary cylinder 63 comes into contact with the upper clamp 53, thereby pushing the upper clamp 53 downward.

Accordingly, the sheet-shaped mold MA can be grasped with a uniform pressure substantially across the entire length in the width direction (the Y-axis direction) of the upper clamp 53.

Meanwhile, in the above description, the sheet-shaped mold MA is grasped by moving the upper clamp 53 while fixing the lower clamp 55. Instead, the sheet-shaped mold MA may be grasped by moving the lower clamp 55 while fixing the upper clamp 53, or the sheet-shaped mold MA may be grasped by moving both of the upper clamp 53 and the lower clamp 55. In the case of moving the lower clamp 55, the lower clamp 55 may be provided and moved integrally with the molded product holder support 29.

Now, the tension adjusting unit (a mold length adjusting device) 27 will be described further in detail.

The tension adjusting unit 27 includes guide bars 67 being integrally supported by a base member 65 and extending in the Z-axis direction, a bearing member 69 engaged with the guide bars 67 via linear guide bearings (not shown) and rendered movable in the vertical direction, and the roller 45 provided on the bearing members 69 in such a manner as to be rotatable around a shaft C3 that extends in the Y-axis direction. The base member 65 is provided integrally with the base 13 via an unillustrated bracket, for example.

As described previously, the roller 45 is present between the detaching roller unit 23 and the mold reeling device 11. The roller 45 is placed below the upper roller 41 or the reeled mold MD on the mold reeling device 11, for example. The sheet-shaped mold MA is wound on the lower side of the roller 45. Here, the width (a dimension in the Y-axis direction of the roller 45 is set greater than the width of the sheet-shaped mold MA, and the center of the roller 45 and the center of the sheet-shaped mold MA coincide with each other in terms of the Y-axis direction.

The tension adjusting unit 27 includes biasing means 71. The biasing means 71 is configured to bias the roller 45 downward, for example, in such a direction (which is a downward direction in FIG. 1, FIG. 2, and so forth) to apply the tension to the flat-plate sheet-shaped mold MA wound on the roller 45 so as to apply the appropriate tension to the flat-plate sheet-shaped mold MA.

To be more precise, the biasing means 71 includes an air cylinder 73 and an air pressure control module (such as a regulator 75 and a directional control valve 77) configured to control an air pressure to be supplied to the air cylinder 73.

The air cylinder 73 is placed below the roller 45, for example. A cylinder portion of the air cylinder 73 is provided integrally with the base member 65. A piston rod of the air cylinder 73 protrudes upward from the cylinder portion and a tip end portion of the piston rod is connected to the bearing member 69.

In addition, an internal space on a rod side (an upper side) of the air cylinder 73 is connected directly to a compressed air source 79. Meanwhile, an internal space on a head side (a lower side) of the air cylinder 73 is connected to the compressed air source 79 via the regulator 75 and the directional control valve 77.

Moreover, a biasing force by the biasing means 71 can be changed by switching the directional control valve 77 under control of the control device 21. Here, each of the internal space on the rod side of the air cylinder 73 and the internal space on the head side of the air cylinder 73 communicates with the atmosphere via a release valve (not shown) so as to avoid an excessive rise in the air pressure in each internal space.

Specifically, in the state where a solenoid Solb of the directional control valve 77 is turned off (in the state shown in FIG. 8), the compressed air of the same pressure is supplied to the internal space on the rod side of the air cylinder 73 and the internal space on the head side of the air cylinder 73. Meanwhile, the area of the internal space on the rod side of the air cylinder 73 is made smaller than the area of the internal space on the head side of the air cylinder 73 since the piston rod is provided.

Figure 8:
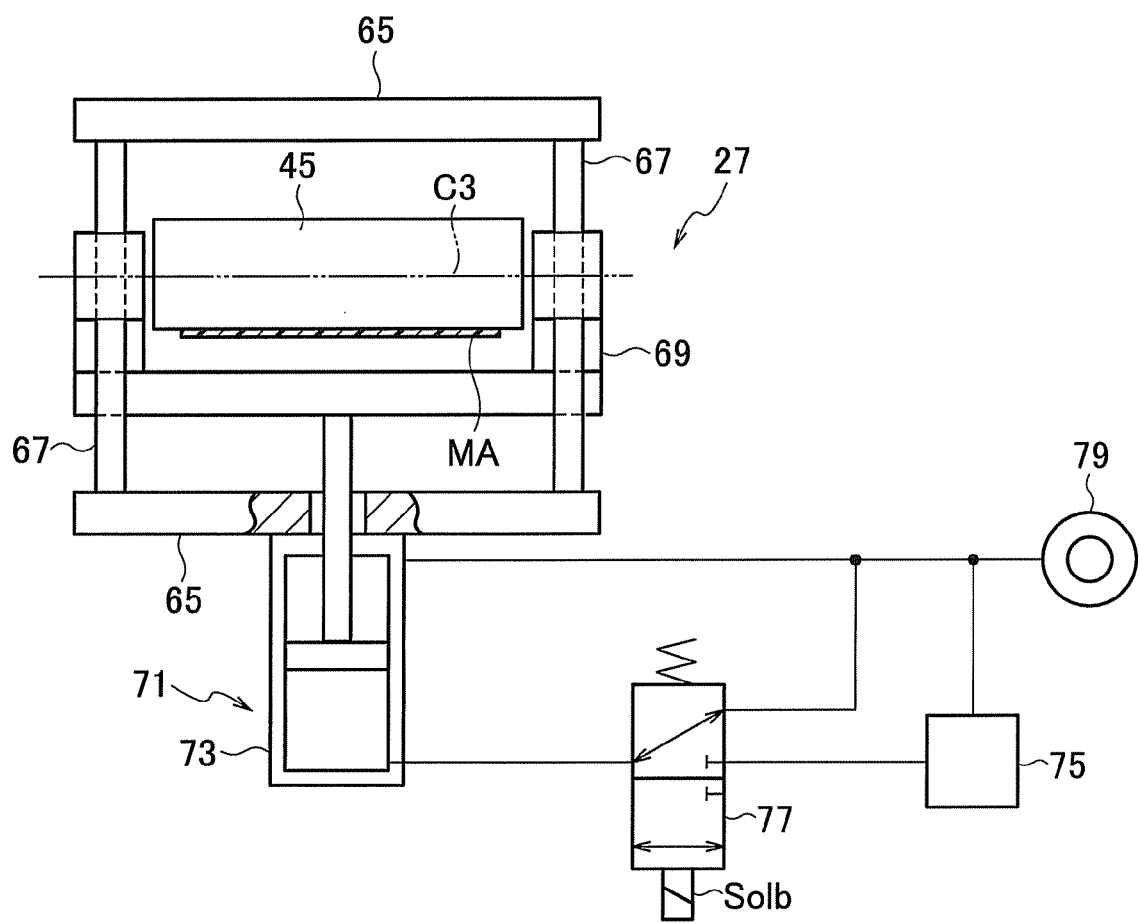
FIG. 8 is a view showing an outline of a tension adjusting unit according to the embodiment of the present invention.

Accordingly, in the state shown in FIG. 8, the roller 45 is supposed to be moved upward and be unable to apply the tension to the sheet-shaped mold MA. Nevertheless, a downward force attributed to the mass (weight) of the roller 45 applies to the roller 45 in reality, so that the roller 45 can apply the tension to the sheet-shaped mold MA.

Meanwhile, in the state where the solenoid Solb of the directional control valve 77 is turned on, the air pressure to be supplied to the internal space on the head side of the air cylinder 73 is made smaller than the air pressure of the air pressure source 79 by means of the regulator 75. As a consequence, a larger force for the downward movement acts on the roller 45.

The directional control valve 77 is switched in order to minimize a variation width of the tension of the sheet-shaped mold MA. The variation width of the tension of the sheet-shaped mold MA can be minimized, for example, by providing a tension detector that can detect the tension of the sheet-shaped mold MA, and switching the directional control valve 77 depending on a result of detection by the tension detector.

Detection of the tension by the tension detector is conducted by use of a load cell (not shown), for example, which detects a load generated at the bearing of the roller 45. Meanwhile, the directional control valve 77 is switched in such a way that the solenoid Solb of the directional control valve 77 is turned off when the load detected by the load cell is greater than a predetermined threshold and the solenoid Solb of the directional control valve 77 is turned on when the load detected by the load cell is smaller than the predetermined threshold.

Although the pressure of the air to be supplied to the internal space on the lower side of the air cylinder 73 is changed in two steps in the above description, the air pressure may be changed in three or more steps or may be changed steplessly and continuously instead.

Alternatively, moving velocities of the lower roller 39 and the upper roller 41 (a moving velocity of the roller support 43 when detaching the sheet-shaped mold MA) may be changed as appropriate depending on the result of detection by the tension detector.

Specifically, the moving velocities of the lower roller 39 and the upper roller 41 may be increased when the tension of the sheet-shaped mold MA detected with the tension detector becomes smaller, and then the moving velocities of the lower roller 39 and the upper roller 41 may be gradually decreased in accordance with the tension of the sheet-shaped mold MA detected with the tension detector, which grows larger. In this way, the sheet-shaped mold MA may be detached efficiently while preventing the sheet-shaped mold MA from application of an excessive tension and avoiding damage on the transfer pattern to be transferred to the molded product W.

Since the tension adjusting unit 27 includes the roller 45 and the air cylinder 73, the sheet-shaped mold feed positioning device 3 can adjust the tension of the flat-plate sheet-shaped mold MA substantially at a constant level by using the simple configuration without conducting complicated control.

Moreover, the compressed air supplied to the air cylinder 73 is a gas having compressibility. Accordingly, in case of a sudden change in the condition of the flat-plate sheet-shaped mold MA for any reason, the tension can be adjusted in response to the sudden change. Thus, it is possible to prevent the sheet-shaped mold MA from being cut off and from other troubles even when there is a sudden change in the condition of the flat-plate sheet-shaped mold MA.

Now, operations of the transfer system 1 will be described.

First, in an initial state, the sheet-shaped mold MA is assumed to extend between the unused-rolled mold MC located on the unused-rolled mold locating device 9 and the reeled mold MD on the mold reeling device 11 with a predetermined tension, and the extending sheet-shaped mold is assumed to be wound on the detaching roller unit 23 (the lower roller 39 and the upper roller 41) as well as on the roller 45 of the tension adjusting unit 27.

Meanwhile, the molded product W before undergoing the transfer process is assumed to be located on the transfer device 5 and prepared for the transfer process. In the detaching device 7, the molded product holder 19 is assumed to be moved downward while the upper clamp 53 is assumed to be moved upward, and the detaching roller unit 23 (the lower roller 39 and the upper roller 41) is assumed to be placed downstream of the molded product holder 19.

In the initial state, when the transfer process is first conducted by the transfer device 5, the molded product W and the sheet-shaped mold MA adhere to each other as a consequence of the transfer process.

After the transfer process by the transfer device 5, the sheet-shaped mold feed positioning device 3 feeds and positions the sheet-shaped mold MA on the downstream side, thereby placing the molded product W that adheres to the lower surface of the sheet-shaped mold MA in the position immediately above the molded product W (see FIG. 5(a)).

Subsequently, another molded product W to be subjected to the next transfer process is located on the transfer device 5. At the same time, the molded product W is held by the molded product holder 19 by moving the molded product holder 19 of the detaching device 7 upward, and the sheet-shaped mold MA is held by moving the upper clamp 53 downward (see FIG. 5(*b*)). After the sheet-shaped mold MA is held by the upper clamp 53 and the lower clamp 55, the transfer device 5 performs the next transfer process.

Figure 6:
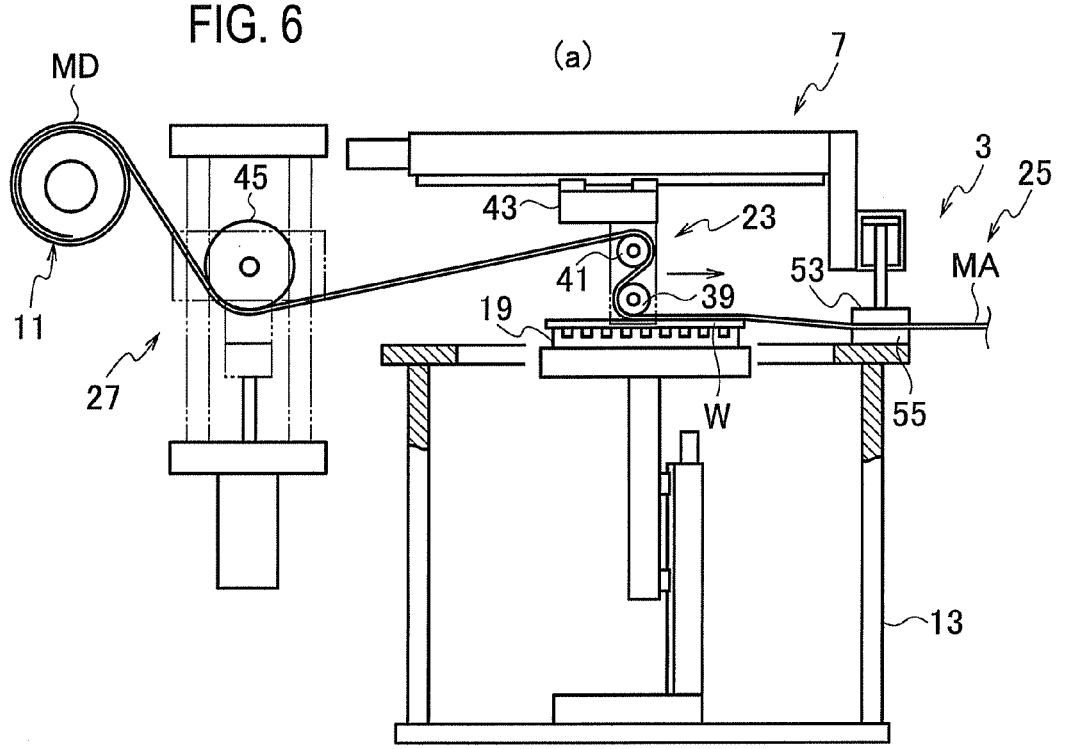
FIG. 6 is a view showing the operations of the demolding device.
Figure 6:
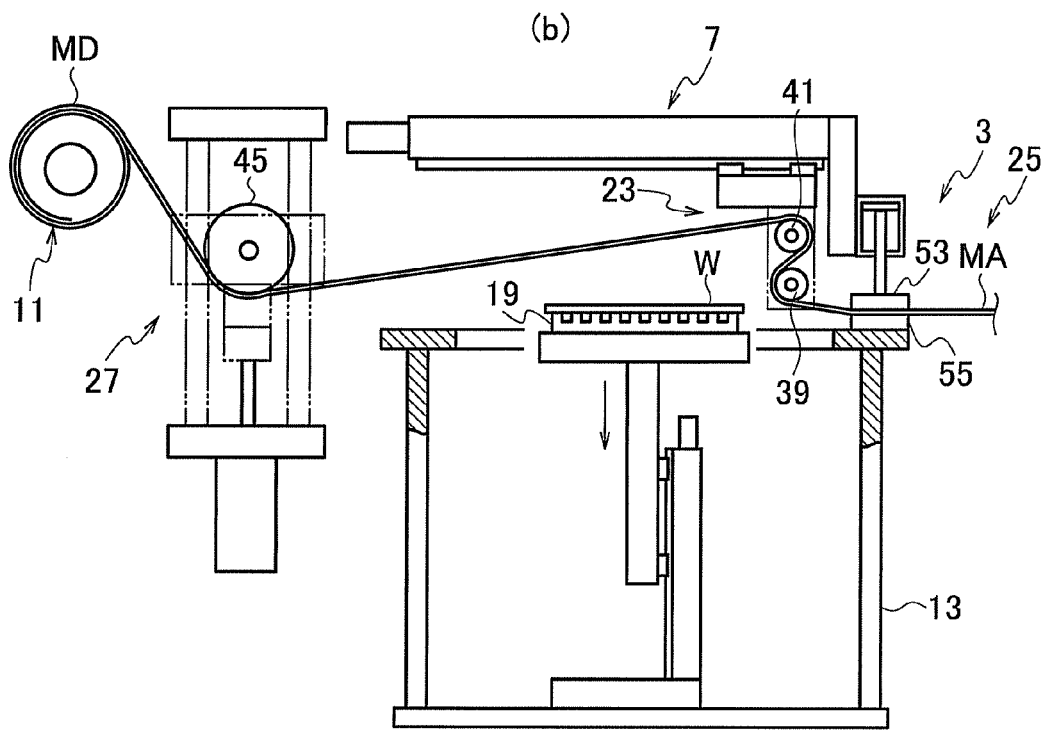
Figure 7:
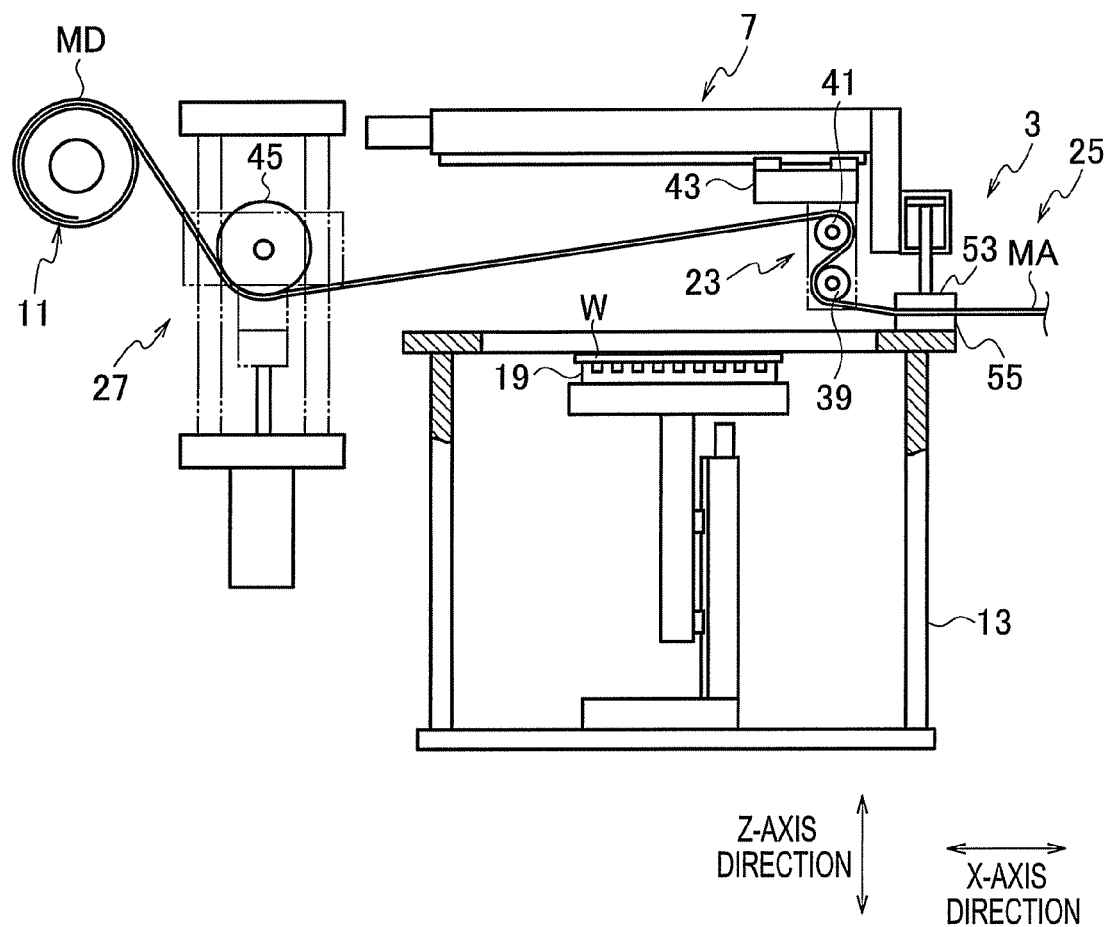
FIG. 7 is a view showing the operations of the demolding device.

Then, the sheet-shaped mold MA is detached from the molded product W by moving the detaching roller unit 23 (the lower roller 39 and the upper roller 41) to the upstream side (see FIGS. 6(*a*) and 6(*b*)).

Next, the molded product holder 19 is moved downward to cause the molded product holder 19 to stop holding the molded product W, and the molded product W is thus removed from the molded product holder 19. Then, the upper clamp 53 is moved upward to cause the mold holding unit 25 to stop holding the sheet-shaped mold MA, and the detaching roller unit 23 (the lower roller 39 and the upper roller 41) is moved back to the downstream of the molded product holder 19.

Then, the subsequent molded product W is similarly detached from the sheet-shaped mold MA.

As a consequence of the above-described operations, the transfer process is performed one by one on the multiple molded products W by using the sheet-shaped mold MA that extends between the unused-rolled mold locating device 9 and the mold reeling device 11. In the meantime, the multiple molded products W are detached one by one from the sheet-shaped mold MA. In other words, the transfer process and the detachment process are conducted as roll-to-roll processing.

According to the detaching device 7 of the transfer system 1, the structure of the device can be simplified since the device is configured to detach the sheet-shaped mold MA, which adheres to the molded product W, from the molded product W in a location away from the transfer device 5.

Specifically, since the molded product holder 19, the detaching roller unit 23, and the like are located away from the transfer device 5, the molded product holder 19, the detaching roller unit 23, and the like do not interfere with the transfer device 5. Thus, the freedom of designing installation spaces for the molded product holder 19, the detaching roller unit 23, and the like expands and the structure of the device is therefore simplified.

Meanwhile, according to the detaching device 7 of the transfer system 1, even if fine dust or the like is generated when the sheet-shaped mold MA is detached from the molded product W, such dust does not reach the transfer device 5. Thus, it is possible to conduct the accurate transfer process since the fine dust does not adversely affect the transfer process.

Moreover, according to the detaching device 7 of the transfer system 1, the transfer and the detachment of the sheet-shaped mold MA from the molded product W are performed in mutually different locations. Thus, it is possible to perform the transfer and the detachment of the sheet-shaped mold MA from the product W concurrently, thereby reducing the time required for the transfer.

In addition, according to the detaching device 7, a detachment angle (an angle of intersection between the upper surface of the molded product W held by the molded product holder 19 and the sheet-shaped mold MA wound on the lower roller 39) of the detaching roller unit 23 is unchanged. Accordingly, the sheet-shaped mold MA can be detached from the molded product W with a substantially constant force. Thus, the transfer pattern transferred to the molded product W can be prevented from damage by the detachment.

Further, since the detaching device 7 is provided with the mold holding unit 25, the sheet-shaped mold MA can be prevented from displacement in the X-axis direction (displacement at the transfer device 5 in particular) even when the detachment by the detaching roller unit 23 (the detachment of the sheet-shaped mold MA from the molded product W) has been completed.

Specifically, in the state where the lower roller 39 and the upper roller 41 are detaching the sheet-shaped mold MA as shown in FIG. 6(*a*), the sheet-shaped mold MA adheres to the molded product W and the molded product W is held by the molded product holder 19. Accordingly, even if the sheet-shaped mold MA is not held by the upper clamp 53 and the lower clamp 55, for example, the force to be applied from the lower roller 39 and the upper roller 41 to the sheet-shaped mold MA prevents the displacement of the sheet-shaped mold MA that is present on the transfer device 5 side.

On the other hand, in the state where the lower roller 39 and the upper roller 41 have completed the detachment of the sheet-shaped mold MA (when the lower roller 39 and the upper roller 41 are located away from the molded product holder 19 and placed upstream of the molded product holder 19) or in the state immediately before completion of the detachment as shown in FIG. 6(*b*), the sheet-shaped mold MA present at the transfer device 5 side is displaced by the force applied from the lower roller 39 and the upper roller 41 to the sheet-shaped mold MA unless the upper clamp 53 and the lower clamp 55 hold the sheet-shaped mold MA.

Nonetheless, since sheet-shaped mold MA is held by the upper clamp 53 and the lower clamp 55, the detaching device 7 can prevent the displacement of the sheet-shaped mold MA at the transfer device 5.

Figure 10:
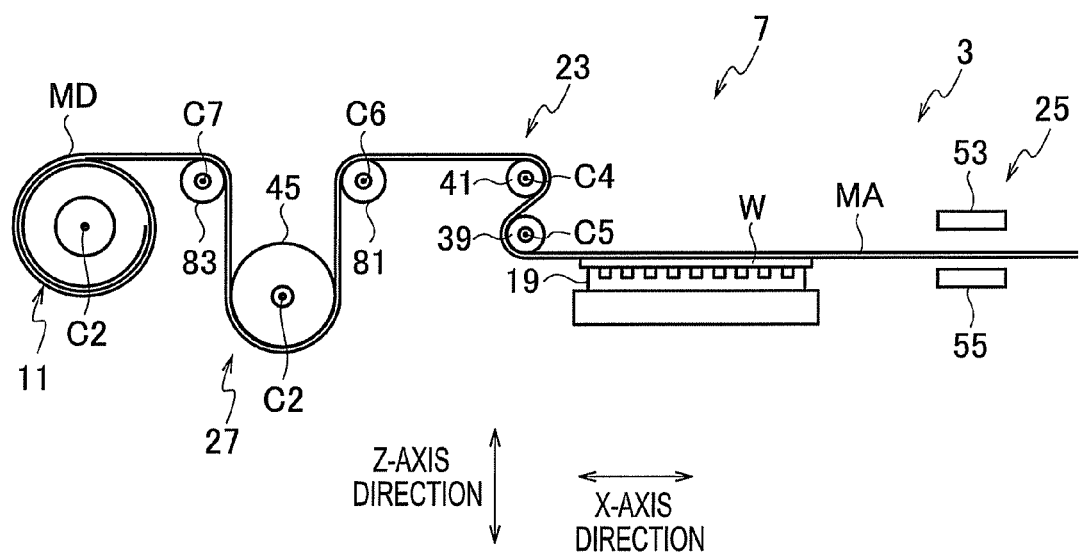
FIG. 10 is a view corresponding to FIG. 1, which shows an outline of the demolding device according to the embodiment of the present invention.

In the meantime, as shown in FIG. 10, a guide roller 81 may be provided between the upper roller 41 and the roller 45 and a guide roller 83 may be provided between the roller 45 and the mold reeling device 11. Here, the guide rollers 81 and 83 are rotatable around shafts C6 and C7 extending in the Y-axis direction, respectively.

The sheet-shaped mold MA is wound on the guide rollers 81 and 83. In the place between the guide roller 81 and the roller 45 and the place between the roller 45 and the guide roller 83, the sheet-shaped mold MA always extends in the Z-axis direction irrespective of the location of the detaching roller unit 23 and a change in the outside diameter of the reeled mold MD. In other words, a winding angle of the sheet-shaped mold MA on the lower side of the roller 45 is always equal to 180°.

As a consequence, it is easier to adjust the tension of the sheet-shaped mold MA with the roller 45 of the tension adjusting unit 27.

In the above description, the lower roller 39 and the upper roller 41 are configured to be rotated in accordance with the movement of the roller support 43. Here, at least any one of the lower roller 39 and the upper roller 41 may be configured to be rotated synchronously with the movement of the roller support 43 by using an actuator such as a servo motor.

Meanwhile, the sheet-shaped mold MA adhering to the molded product W may be detached directly by using the reeled mold MD.

Figure 11:
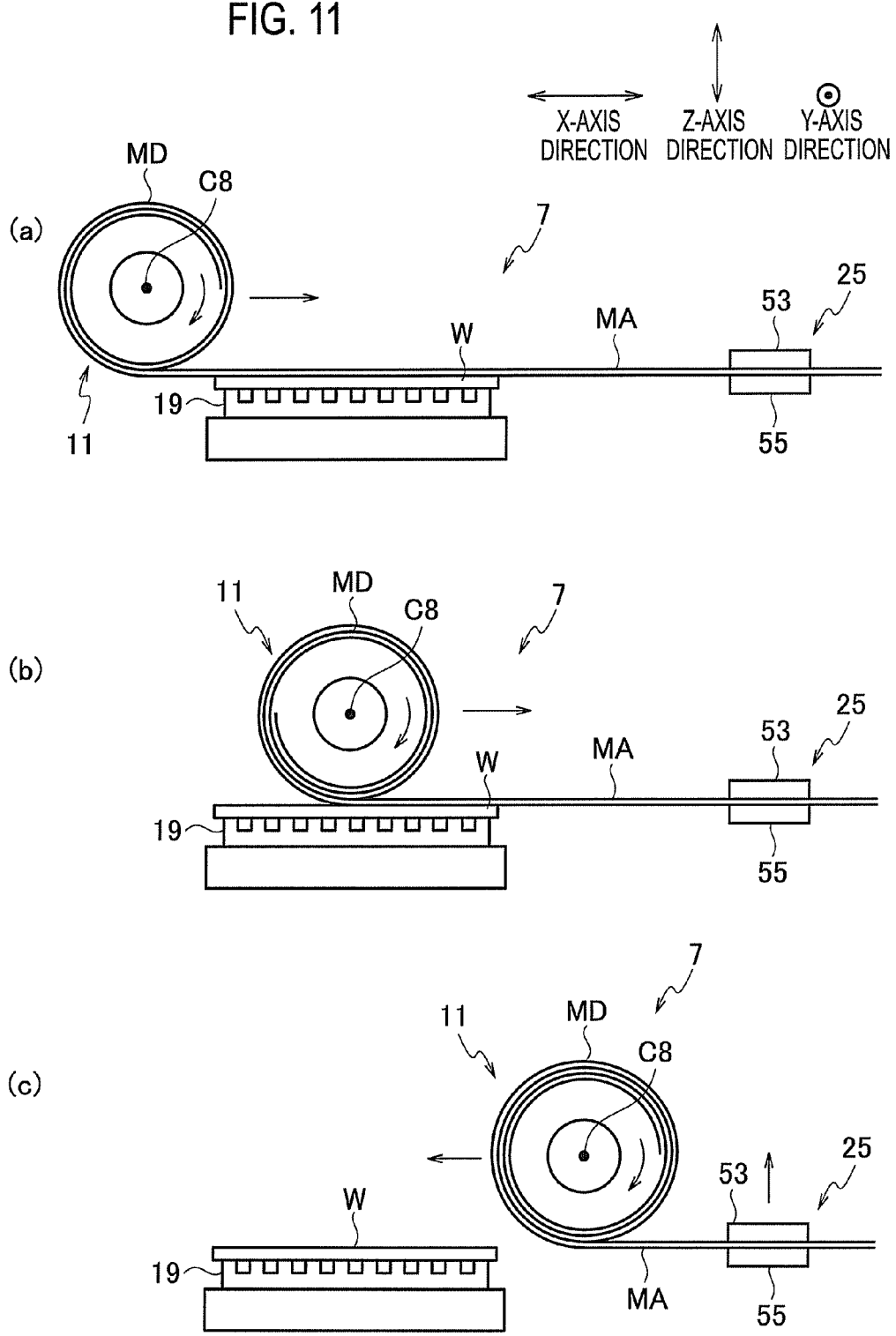
FIG. 11 is another view corresponding to FIG. 1, which shows the outline of the demolding device according to the embodiment of the present invention.

Specifically, as shown in FIG. 11, the sheet-shaped mold MA may be detached by rotating the reeled mold MD around a shaft C8 that extends in the Y-axis direction and moving the reeled mold MD from the left to the right in the X-axis direction. Here, the reeled mold MD is assumed to be freely moved and positioned in the Z-axis direction as well.

The invention claimed is:

1. A demolding device for detaching a sheet-shaped mold from a flat-plate molded product, the demolding device comprising:

a molded product holder placed in a location different from a transfer site where a transfer of a pattern formed on a first region of the mold to the molded product takes place, the molded product holder being constructed and arranged to hold the molded product while the molded product is adhered to the first region of the mold;

a detaching roller about which the mold is wound, the roller being movably provided above the molded product holder in an extending direction of the mold to roll up and detach the mold from the molded product held by the molded product holder; and a mold holder provided between the molded product holder and the transfer site, and constructed and arranged to hold stationary a second region of the mold, wherein the molded product does not adhere to the second region of the mold.

2. The demolding device according to claim 1, further comprising:

a tension adjuster constructed and arranged to adjust a tension of the mold.

3. The demolding device according to claim 1, wherein the mold holder is constructed and arranged to hold the second region of the mold at equivalent level to the first region of the mold at the molded product holder.

4. The demolding device according to claim 1, wherein the mold holder is constructed and arranged to hold the second region of the mold while the mold is detached from the molded product.

* * * * *